UNITED STATES PATENT OFFICE.

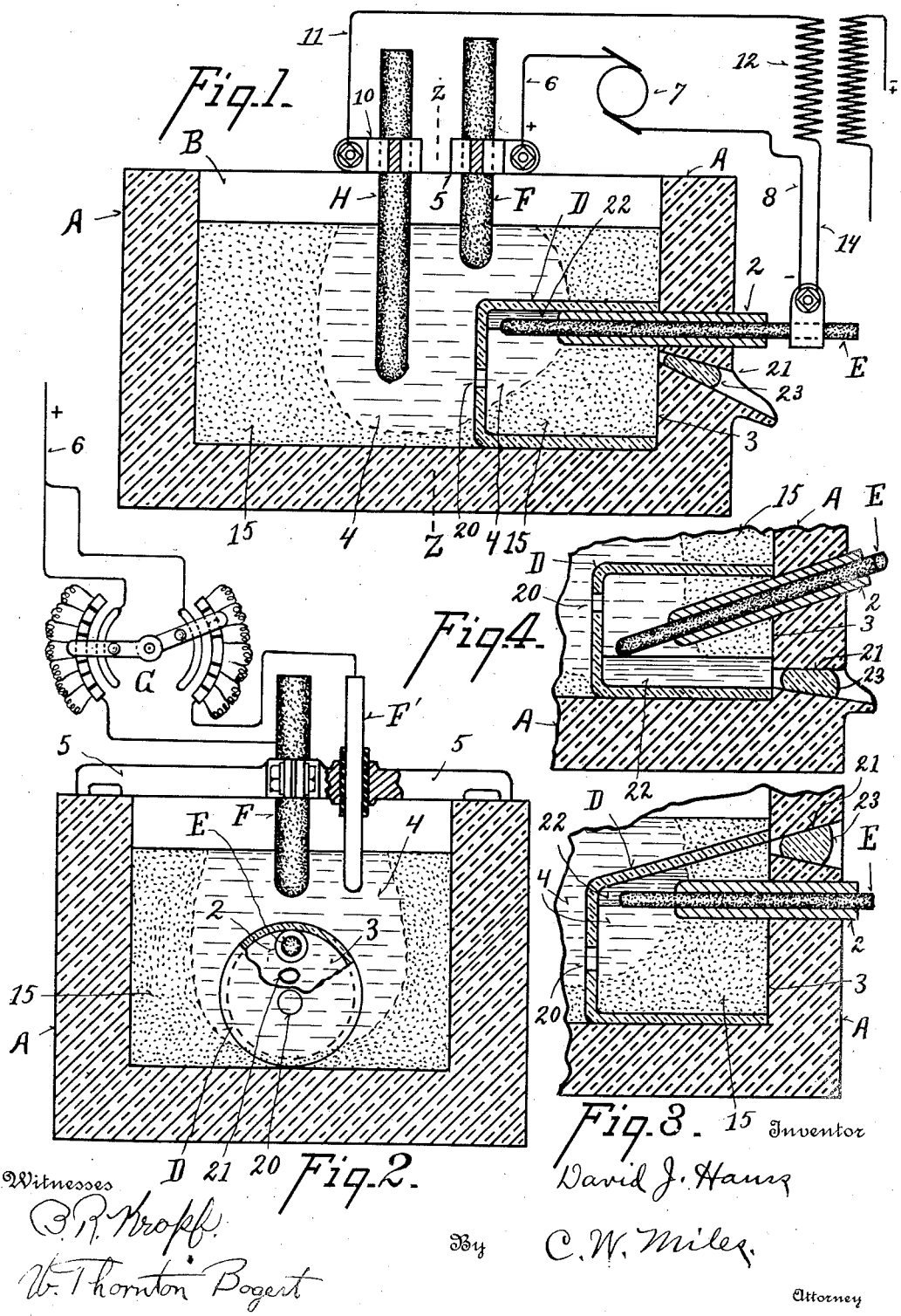

DAVID J. HAUSS, OF AURORA, INDIANA.

ELECTRIC FURNACE.

1,060,839.  Specification of Letters Patent.  Patented May 6, 1913.

Application filed September 8, 1911. Serial No. 648,264.

*To all whom it may concern:*

Be it known that I, DAVID J. HAUSS, a citizen of the United States, residing at Aurora, in the county of Dearborn and State of Indiana, have invented certain new and useful Improvements in Electric Furnaces, of which the following is a specification.

My invention relates to improvements in electrical furnaces.

One of its objects is to produce an improved furnace adapted to produce metallic alloys and chemicals or compounds, and to control the relative proportions of the components.

Another object is to provide improved means to regulate and control the temperature of the furnace, and to vary and control the relative anode and cathode temperatures.

Another object is to provide improved means to accumulate, preserve from alteration, and remove the product.

My invention further consists in certain details of form, combination and arrangement, all of which will be more fully set forth in the description of the accompanying drawings, in which:

Figure 1 is a diagrammatic view showing my improved furnace in central longitudinal section. Fig. 2 is a sectional view on line $z\ z$ of Fig. 1, and illustrating an electrode modification. Fig. 3 is a view similar to Fig. 1 of a portion of a furnace, and illustrating a modification. Fig. 4 is a view similar to Fig. 3, and illustrating another modification.

The accompanying drawings illustrate the preferred embodiments of my invention.

A represents a container or shell of fire clay or similar heat resisting material. Within the main compartment B of the container A I provide an accumulator or supplemental container D which may be formed of fire clay or other heat resisting material, the chemical nature of which is designed to be varied according to, and in order to resist the action of the materials being treated in the furnace.

E represents one of the electrodes, usually the cathode, which is preferably enveloped for a portion of its length in an insulating and heat resisting tube or sleeve 2, and which projects through the wall of container A and into the chamber 3 formed by the accumulator D, where a portion of the electrode projects from the sleeve 2 so as to contact with the electrolyte 4.

F represents an electrode supported by means of a bracket 5 resting upon the top of the side walls of container A, said electrode being connected by means of a wire 6 with a source of direct current 7, which source of direct current is also connected by means of wire 8 with the electrode E. For the electrolysis of simple or mixed chemical compounds a single electrode F may be employed, as for instance for depositing pure aluminum from its compounds, or in depositing an alloy of aluminum and another metal from an electrolyte containing both metals. Where it is desired to deposit one metal by electrolysis from the electrolyte and to alloy therewith another metal which is transferred by the current from one electrode to the other, a single electrode F of the metal to be transferred may be employed, but I preferably employ two electrodes F and F' the electrode F being of carbon or non-corrosive material, and the electrode F' of the metal to be transferred by the current. Where electrodes F and F' are employed as illustrated in Fig. 2, I preferably connect said electrodes in parallel to the source of direct current and provide an adjustable resistance G or other means for varying the relative amount of current passing through the respective electrodes F and F' whereby the relative amount of metal in the alloy produced by electrolysis and by transference may be varied and regulated to produce alloys of varying proportions, or of definite proportions as desired.

H represents an electrode supported upon a bracket 10 and connected by a wire 11 with a transformer or other source of alternating current 12, which source of alternating current is also connected by wire 14 with the electrodes E. The arrangement of the electrodes is such that a direct current passes through the electrolyte between the electrodes E and F, or between the electrode E and the two electrodes F F' with controllable and relatively different proportions passing through the respective electrodes F and F', while an alternating current which is preferably controllable as to volume passes between the electrodes E and H. The alternating current between the electrodes E and H serves to heat and maintain the electrolyte at the desired temperature, and also to maintain the electrode E and the metal or alloy accumulating or accumulated upon said electrode at the desired temperature, and also preferably at a higher temperature than the electrode F or the electrodes F F', thereby avoiding corrosive or injurious effects at said electrodes F and F', such as partial interruption of the current by gases generated, for instance.

Various electrolytes may be employed, and among others I contemplate employing an electrolytic material, in granular or pulverulent form, indicated by 15 in the drawings, which serves as a non-conductor of heat, and as a non-corrosive container or lining for the interior of the container A, while the portion 4 of electrolytic material in the immediate neighborhood of the electrodes is maintained in a fused or fluid condition by the heat of the electric currents.

I preferably employ an accumulator D within which one of the electrodes, usually the cathode is located. The accumulator is preferably suitably anchored in position, and is provided with an opening 20 through which communication is established between the fluid portions of the material to be treated within and without said accumulator. A port 21 is also provided through which the accumulated metal, alloy, or product 22 may be removed from the accumulator, and which port is adapted to be closed preferably by means of a plug 23 of heat resisting material.

In Figs. 1 and 3 I have illustrated modifications of the accumulator adapted to be employed where the product accumulating within the accumulator is of less specific gravity than the electrolyte, and in Fig. 4 I have illustrated a form adapted to treat materials in which the product within the accumulator is of greater specific gravity than the electrolyte. If desired the electrode F or the electrodes F F' may be located also in an accumulator in the same manner as the electrode E, thus employing two accumulators at the same time one to receive the anode products of electrolysis and the other to receive the cathode products. The accumulator, particularly with metal or alloy products serves to prevent alteration or oxidation of the product, and in the case of products of less specific gravity than the electrolyte, to prevent said products from rising to the surface of the electrolyte where they would be exposed to oxidizing or similar influences. It also serves to confine the product to a small compass, and prevents it from disseminating through the granular or fluid portion of the material to be treated.

The employment of both alternating and direct current provides for maintaining the desired temperature in the fluid electrolyte, and particularly where it contacts with the electrode E, which can thus be maintained at a higher temperature than other portions of the electrolyte. It also enables a direct current of comparatively low voltage to be employed. Also by exposing larger electrode areas at H and F, or F F', and particularly with low temperatures of the electrolyte in the neighborhood of said electrodes, the corrosive action on said electrodes is greatly diminished, and interruption of the direct current particularly by the accumulation of or generation of gases at said electrodes is prevented.

The mechanism herein illustrated and described is capable of considerable modification without departing from the principle of my invention.

Having described my invention, what I claim is:

1. An electric furnace comprising a container to hold a body of material to be treated, one or more metallic electrodes to serve as anodes and connected to a source of direct current, an electrode connected to a source of alternating current, an electrode connected to serve as a cathode and connected to said source of direct current and to said source of alternating current, the action of said direct and alternating currents serving to fuse the material to be treated and said direct current between said anode and cathode serving to electrolyze the material to be treated and to deposit one of its components at said cathode and also to transfer the anode material to and alloy it with said cathode deposit.

2. An electric furnace comprising a container to hold a body of material to be treated, one or more metallic electrodes to serve as anode and connected to a source of direct current, an electrode connected to a source of alternating current, an electrode connected to serve as a cathode and connected to said source of direct current and to said source of alternating current, the action of said direct and alternating currents serving to fuse the material to be treated and said direct current between said anode and cathode serving to electrolyze the material to be treated and to deposit one of its components at said cathode and also to transfer the anode material to and alloy it with said cathode deposit, and means to retain said alloy beneath the surface of the electrolyte.

3. An electric furnace comprising a container to hold a body of material to be treated, a metallic electrode to serve as anode and connected to a source of direct current, an electrode to serve as a cathode and connected to said source of direct current, an alternating current passing from one electrode to another through the material to be treated, and means to control the relative amount of direct and alternating current passing through the material to be treated, the action of said direct and alternating currents serving to fuse the material to be treated and said direct current between said anode and cathode serving to electrolyze the material to be treated and to deposit one of its components at said cathode and also to transfer the anode material to and alloy it with said cathode deposit.

4. An electric furnace comprising a container adapted to hold a body of material to be treated, an accumulator compartment located within said container and adapted to be embedded in the material to be treated and to accumulate and hold the product beneath the surface of the material to be treated, an electrode connected to a source of direct current, an electrode connected to a source of alternating current, and an electrode connected to both said source of direct and alternating current, one of said electrodes carrying direct current being located within said accumulator compartment.

5. An electric furnace comprising a container for a body of material to be treated, an accumulator located in said container beneath the surface of the material to be treated and communicating through a substantially horizontal opening with the interior of said container, a metallic electrode located in said container outside of said accumulator to serve as an anode and connected to a source of direct current, an electrode to serve as a cathode located within said accumulator and connected to said source of direct current, the action of the current from one of said electrodes to the other serving to fuse and electrolyze the material to be treated and to deposit one of its components at said cathode and also to transfer the material of said anode to and alloy it with said cathode deposit.

6. An electric furnace comprising a container for a body of material to be treated, an electrode connected to a source of direct current, an electrode connected to a source of alternating current, an electrode connected to said source of direct current and to said source of alternating current, and an accumulator within which one of said direct current carrying electrodes is located, said accumulator opening horizontally into said container below the surface of the material to be treated and adapted to confine one of the products of electrolysis below the surface of the material to be treated.

7. An electric furnace comprising a container adapted to hold a body of material to be treated, an electrode connected to a source of direct current, an electrode connected to a source of alternating current, an electrode connected to said source of direct current and to said source of alternating current, and an accumulator within said container located below the surface of the material to be treated with an opening into said container, and within which one of said direct current carrying electrodes is located adapted to confine one of the products of electrolysis below the surface of the material to be treated.

8. An electric furnace comprising a container adapted to hold a body of material to be treated, a metallic electrode adapted to serve as an anode and connected to a source of direct current, an electrode connected to a source of alternating current, an electrode adapted to serve as a cathode and connected to said source of direct current and to said source of alternating current, the action of said direct and alternating currents serving to fuse the material to be treated, and said direct current between said anode and cathode serving to electrolyze the material to be treated and to deposit one of its components at said cathode, and also to transfer the material of said anode to and alloy it with said cathode deposit.

In testimony whereof I have affixed my signature in presence of two witnesses.

DAVID J. HAUSS.

Witnesses:
C. W. MILES,
W. THORNTON BOGERT.